2,007,316

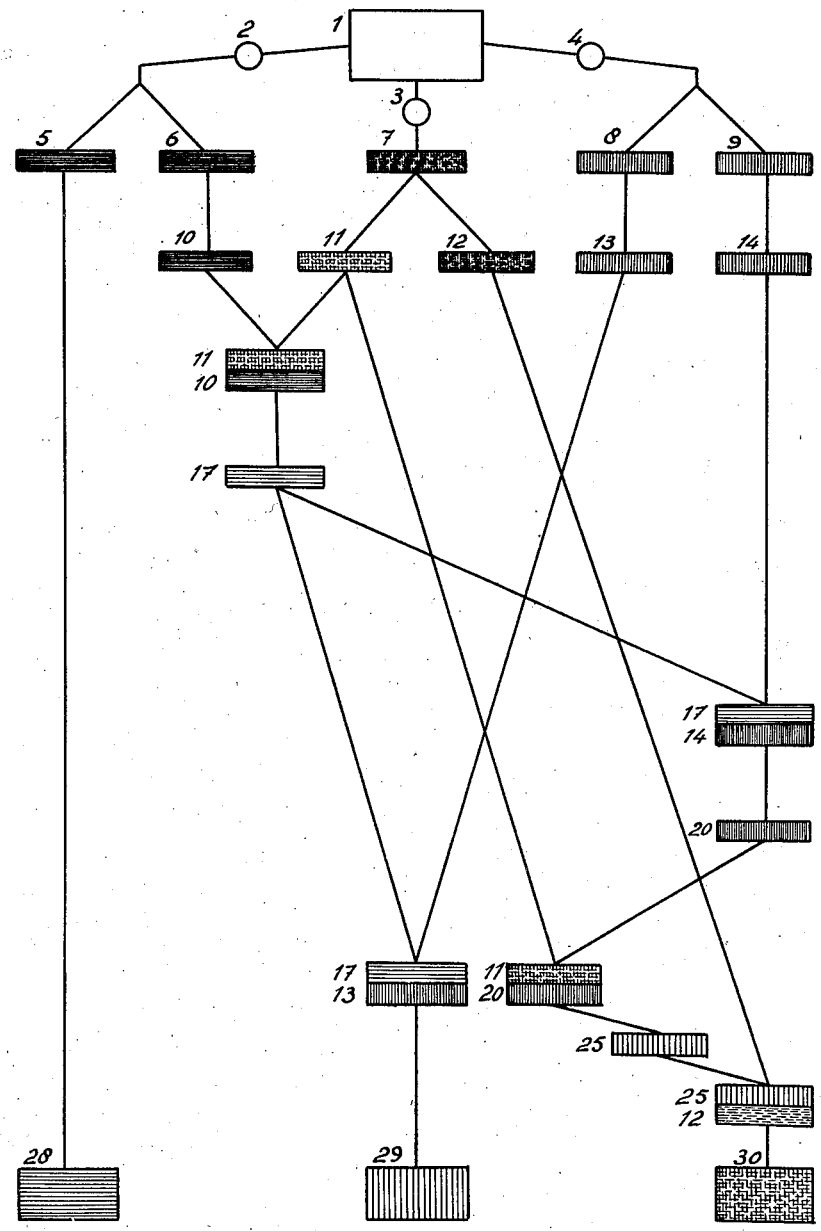
July 9, 1935.  L. O. VAN STRAATEN  2,007,316
PRODUCTION OF CORRECTED COLOR SELECTION POSITIVES
FOR COLOR PHOTOGRAPHY AND MULTICOLOR PRINTING
Filed June 11, 1934
INVENTOR
LOUIS OSCAR VAN STRAATEN  DECEASED
By SARA JACOBA VAN STRAATEN  BORN
AGELINK VAN RENTERGEM  EXECUTRIX
By Emil Bönnelycke
ATTORNEY Patented July 9, 1935

UNITED STATES PATENT OFFICE 2,007,316

PRODUCTION OF CORRECTED COLOR-SELECTION POSITIVES FOR COLOR PHOTOGRAPHY AND MULTICOLOR PRINTING

Louis Oscar van Straaten, deceased, late of Biggekerke, Netherlands, by Sara Jacoba van Straaten, born Agelink van Rentergem, executrix, Biggekerke, Netherlands Application June 11, 1934, Serial No. 730,138 In the Netherlands June 24, 1933

4 Claims. (Cl. 95—2)

This invention relates to a process for the production of corrected color-selected positives for multi-color prints, colored prints on transparent material, glass, lantern slides and the like.

In the production of clichés for these purposes, it is known to produce two, three or more negatives, with the aid of three color filters (e. g. green, violet and orange) whilst at the same time and on the same negatives a scale of primary colors, e. g. blue, yellow and red is produced. This strip with the primary colors serves for judging whether the correct shade is obtained. This method is used in the process according to the present invention, but in conjunction with a new method which will be described in the following and which achieves the object that at the end of the various stages in the process the required completely corrected clichés for multi-color printing are produced without the necessity of any retouching. When employing any of the known methods, including the method described in the specification of Brit. Patent No. 353,151 retouching to a greater or smaller extent is always necessary.

It is found in practice that the orange filters available are nearly correct, that is absorb practically all the blue rays from ordinary daylight allowing all the red and yellow rays to act upon the plate which when developed is called the blue plate, whereby the diapositive (28) made from the latter has a sufficiently correct shading corresponding to the blue rays. The other filters, i. e., the violet and green filters always have a general incorrectness, although filters from different sources may have it in different degree. This general incorrectness takes the form of allowing rays which should be absorbed to pass, for example, all green filters which should absorb all the yellow rays and allow all the blue rays to pass, actually pass some of the yellow rays which produces an incorrect shading of the plate which the present invention eliminates. Similarly all green filters fail to absorb all of the red rays. The present invention teaches a novel general procedure for correcting these general defects of violet and green filters and it is within the skill of the expert in this art to apply the degree of correction necessary for any particular filters being used, once the general procedure herein taught has been grasped.

It is to be understood that the plates shown hatched in the drawing and herein referred to as the blue, yellow, and red plates are not actually so colored but are black like an ordinary negative. They merely have the respective shadings or tone values corresponding to those produced by blue, yellow, and red rays, respectively.

The invention consists in a process for producing clichés for multicolor prints, colored prints on transparent material, lantern slides and the like consisting of producing two, three or more photographic negatives of an object with a scale of primary colors by employing a number of different color filters, for example, green violet and orange, whereby a scale of primary colors for example blue, yellow and red, is reproduced at the same time as the subject of the picture, wherein the correction of the negative red plate obtained with the aid of a green filter is obtained by chromating a negative blue plate and shading it off by means of the diapositive obtained from a yellow plate negative and after correctly shading off making a diapositive from said blue plate, whereupon said diapositive is used for shading off a negative red plate and making a completely corrected diapositive red plate from said negative red plate.

The invention will be hereinafter more particularly described with reference to the accompanying drawing.

In the following description the various stages of the process will first be described without any reference being made to the reasons why the various stages are necessary. An explanation of the reasons for the various stages in the process will then follow.

For the sake of clearness the following table, giving the significance of the different reference numbers, is included.

1=original model
2=orange filter
3=violet filter
4=green filter
5=first negative blue plate
6=second negative blue plate
7=negative yellow plate
8=first negative red plate
9=second negative red plate
10=chromated negative second blue plate
11=diapositive of negative yellow plate
12=chromated negative yellow plate
13=chromated first negative red plate
14=chromated second negative red plate
17=diapositive of second chromated blue plate shaded off
20=negative 14 again gelatinated and chromated
25=diapositive of 20

28 = corrected diapositive of first negative blue plate
29 = corrected diapositive of first red plate
30 = corrected diapositive of negative yellow plate.

The process consists first in taking five photographs of the original with the employment of color filters i. e. an orange filter with which two photographs are taken for producing blue plates, a violet filter with which one photograph is taken for producing a yellow plate and a green filter with which two photographs are taken for producing red plates.

For simplicity, the expressions "blue plate", "yellow plate" and "red plate" are used throughout the description where a negative, on which the complementary colors of blue, yellow or red have acted to a certain degree, is intended.

In most cases it is not necessary to correct the blue plate 5. In any event the correction is always very slight, so that in practice this plate is not corrected and the necessary diapositive 28 is made directly therefrom. The green filter 4 for producing the red plates must be of such a quality, that it allows the yellow rays from the original to pass completely. The consequence thereof is, however, that the blue rays act less intensively on the plate.

The correction of the red plate 8 is effected in the following manner. Before using the blue plate 6 for correction of the blue in the red plate 8, a diapositive 11 of the yellow plate 7 is first made, the latter being obtained with the aid of the violet filter 3 as already mentioned; this diapositive 11 represents about as much red as yellow, viz. the complementary colors of blue.

This diapositive 11 is now placed on the negative blue plate 10, which has previously been chromated and is then exposed to the light. The blue plate 10 will then, after being washed out and treated with an anilin coloring material of a color which corresponds as much as possible to the color of the cliché, be shaded off at those places where red, yellow and black are represented. The treatment comprising the bringing into contact of a chromated negative with a diapositive, the exposure, the washing out and the treatment with anilin coloring material will hereinafter be called "shading off".

From the blue plate 19 obtained a diapositive 17 is now made, which when employed as the diapositive with the reference number 17 will completely correct the red plate 13, i. e. it will remove all blue without affecting the intermediate colors violet, green and black. The result is that the negative 13 is obtained from which the corrected red diapositive 29 may be obtained.

The yellow plate 7 is corrected in the following manner. In practice the complementary colors for effecting the correction of the yellow plate, consisting of red and blue are not, as was the case with the blue plate, present in one single blue plate or in one single red plate. For the correction of the yellow plate a blue plate and a red plate are therefore necessary. For this purpose one of the red plates (in the drawing red plate 9), after being chromated whereby it forms the red plate 14, is shaded off with the diapositive 17 which has already been used as the diapositive for effecting the correction of the red plate 13; it is then exposed and after being washed out is treated with an anilin coloring material, so that this red plate 14 has obtained a shading off of the blue, gray and black in the red plate 14. The red plate 14 is again provided with a chromated gelatin layer and is then, in the form of the negative 20, shaded off by the existing diapositive 11 of the negative yellow plate 7, and after having been exposed and washed out the plate is treated with anilin coloring material. From the negative 20 hereby obtained a diapositive 25 is made. This diapositive 25 is shaded off with the negative yellow plate 12, which has previously been chromated. This combination, after being exposed and washed out, is treated with an anilin coloring material and then constitutes the completely corrected yellow plate 12, from which the corrected diapositive 30 is made.

An explanation will now be given of the reasons why the various stages are necessary.

The blue plate obtained with the aid of the orange filter 2 is in practice sufficiently correct for direct use, so that no correction or only a very slight correction may be necessary; the blue plate 5 is therefore directly used for making the diapositive 28.

The red plate 8 obtained with the aid of the green filter 4 not only contains an image of the red in the original, but also an image in half intensity of the blue in the original. In order to eliminate the undesired blue from the red plate 8, a diapositive 11 is made from the yellow plate 7, which latter is obtained with the aid of the violet filter 3. This diapositive 11 contains in practice red and yellow, the complementary color of blue, in about the same intensity. The diapositive 11 is now shaded off with the blue plate 10, so that the combination 11—10 is obtained. By doing so the blue plate 10 is shaded off at the places where the colors red, yellow, gray and black are represented. With the aid of the negative blue plate 10 thus obtained the diapositive 17 is made, and this diapositive 17 is used for shading off the negative red plate 13, so that the combination 17—13 is obtained, whereby the shading off again takes place. From the negative red plate 13 thus obtained the blue has disappeared, without affecting the parts which contain violet, gray and black. This negative red plate 13 can therefore be used directly for making the corrected red diapositive 29.

For effecting the correction of the yellow plate which in practice contains as much red as yellow, the red plate 14 is used. This plate is shaded off by the diapositive 17 which has already been obtained during the correction of the red plate. With this combination the parts which contain blue, gray and black will be shaded off more or less. The negative 14 thus obtained is now provided with a chromated gelatin layer, so that the negative 20 is formed and this negative is shaded off by the diapositive 11. The combination 11—20 is thus formed and the yellow, blue, gray and black will be shaded off.

From this negative 20 a diapositive 25 is made and the latter is used for shading off the original yellow plate 12. This plate 12 eliminates the red without affecting yellow, gray and black. The diapositive made from the plate 12 is the completely corrected yellow plate 30.

What is claimed is:—

1. Process for producing clichés for multicolor prints, colored prints on transparent material, lantern slides and the like consisting of producing a plurality of photographic negatives of an object with a scale of primary colors by employing a number of different color filters whereby a scale of primary colors is reproduced at the same time as the subject of the picture, correcting a negative red plate, obtained with the aid of a green filter, by chromating a negative blue plate, shading it off by means of a diapositive obtained from a negative yellow plate and after correctly shading off making a diapositive from said blue plate, using said last recited diapositive for shading off a negative red plate, and making a completely corrected diapositive red plate from said negative red plate.

2. Process for producing clichés for multicolor prints, colored prints on transparent material, lantern slides and the like consisting of producing a plurality of photographic negatives of an object with a scale of primary colors by employing a number of different color filters whereby a scale of primary colors is reproduced at the same time as the subject of the picture, correcting a negative yellow plate by shading off a negative red plate by means of a blue diapositive, sensitizing this red negative again by means of a chromated gelatin film and thereupon shading off the red plate thus obtained by means of a yellow diapositive, making a diapositive from the shaded off red negative, using said last recited diapositive for shading off the negative yellow plate, and making a completely corrected yellow diapositive from the said corrected negative yellow plate.

3. Process for producing clichés for multicolor prints, colored prints on transparent material, lantern slides and the like consisting of producing a plurality of photographic negatives of an object with a scale of primary colors by employing a number of different color filters whereby a scale of primary colors is reproduced at the same time as the subject of the picture, correcting a negative red plate, obtained with the aid of a green filter, by chromating a negative blue plate and shading it off by means of a diapositive obtained from a negative yellow plate and after correctly shading off making a diapositive from said blue plate, using said last recited diapositive for shading off a negative red plate and making a completely corrected diapositive red plate from said negative red plate and effecting the correction of a negative yellow plate by shading off a negative red plate by means of a blue diapositive, sensitizing said last recited red negative by means of a chromated gelatin film and thereupon shading off the red plate thus obtained by means of a yellow diapositive, making a diapositive from the thus obtained red negative, using the same for shading off the negative yellow plate, and making a completely corrected yellow diapositive from the said last recited negative yellow plate.

4. A process for producing clichés for blue, red and yellow colored prints comprising producing a plurality of blue, yellow and red negatives with the aid of orange, violet and green filters, respectively, making a blue diapositive from a blue negative, chromating a blue negative, forming a yellow diapositive, shading off said chromated blue negative with said yellow diapositive forming a corrected blue diapositive from said treated chromated blue negative chromating a red negative, shading off the chromated red negative with the corrected blue diapositive, forming a corrected red diapositive from said shaded off chromated red negative, producing a second shaded off chromated red negative, sensitizing the same, shading off said sensitized red negative with a yellow diapositive, forming a double corrected red diapositive, chromating a yellow negative, shading off said chromated yellow negative with said double corrected red diapositive, and forming a corrected yellow diapositive.

SARA JACOBA VAN STRAATEN,
BORN AGELINK VAN RENTERGEM.
*Executrix of the Estate of Louis Oscar van Straaten, Deceased.*